United States Patent
Lee et al.

(10) Patent No.: US 9,743,225 B2
(45) Date of Patent: Aug. 22, 2017

(54) METHOD AND APPARATUS FOR FORMING COMMUNICATION LINK USING BLUETOOTH

(71) Applicant: LG ELECTRONICS INC., Seoul (KR)

(72) Inventors: Jaeho Lee, Seoul (KR); Jangwoong Park, Seoul (KR); Hyeonjae Lee, Seoul (KR); Minsoo Lee, Seoul (KR); Seungryul Yang, Seoul (KR); Younghwan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/035,093

(22) PCT Filed: Nov. 6, 2014

(86) PCT No.: PCT/KR2014/010604
§ 371 (c)(1),
(2) Date: May 6, 2016

(87) PCT Pub. No.: WO2015/069031
PCT Pub. Date: May 14, 2015

(65) Prior Publication Data
US 2016/0302026 A1 Oct. 13, 2016

Related U.S. Application Data

(60) Provisional application No. 61/900,949, filed on Nov. 6, 2013.

(51) Int. Cl.
*H04W 4/00* (2009.01)
*H04W 8/00* (2009.01)
(Continued)

(52) U.S. Cl.
CPC .......... *H04W 4/008* (2013.01); *H04W 8/005* (2013.01); *H04W 76/021* (2013.01); *H04W 76/023* (2013.01); *H04W 84/20* (2013.01)

(58) Field of Classification Search
CPC ...................................... H04W 4/008
See application file for complete search history.

(56) References Cited

U.S. PATENT DOCUMENTS

| 2013/0122853 | A1 | 5/2013 | Penix et al. | |
|---|---|---|---|---|
| 2014/0104990 | A1* | 4/2014 | Shim | H04B 11/00 367/197 |

FOREIGN PATENT DOCUMENTS

| KR | 10-2008-0039153 A | 5/2008 |
|---|---|---|
| KR | 10-2010-0057721 A | 6/2010 |

(Continued)

*Primary Examiner* — Tuan H Nguyen
(74) *Attorney, Agent, or Firm* — Birch, Stewart, Kolasch & Birch, LLP

(57) ABSTRACT

Embodiments of the present invention relate to methods and devices for forming a communication link using Bluetooth. An embodiment of the present invention provides a method and device, including sending a first message for Bluetooth pairing to a second device, receiving a second message for the Bluetooth pairing from the second device based on the first message, and forming the communication link based on the received message. The first message comprises an identifier (ID) of the first device, and the second message comprises information related to the communication link.

13 Claims, 17 Drawing Sheets

(51) Int. Cl.
*H04W 76/02* (2009.01)
*H04W 84/20* (2009.01)

(56) References Cited

FOREIGN PATENT DOCUMENTS

| KR | 20100057721 | * | 6/2010 | ............... | H04B 1/40 |
|----|-------------|---|--------|-----------------|-----------|
| KR | 10-2013-0009088 A | | 1/2013 | | |
| KR | 10-2013-0102322 A | | 9/2013 | | |

* cited by examiner

FIG. 11

| Op_Code | Data |
|---------|------|

(a) Negotiation message frame (1110)

| Op_Code value | Description |
|---------------|-------------|
| 1 | Request |
| 2 | Response |
| 3 | Confirm |

(b) Op_Code(1120)

Service information packet (1330)

FIG. 15

| Payload | | |
|---|---|---|
| Scan address (6byte) | Adv address (6byte) | MI_flag (1byte) |

(a) Scan request message (1510)

| Payload | | |
|---|---|---|
| Adv address (6byte) | Data (0~31byte) | Listen channel (1byte) |

(b) Scan response message (1520

METHOD AND APPARATUS FOR FORMING COMMUNICATION LINK USING BLUETOOTH

CROSS REFERENCE TO RELATED APPLICATIONS:

This application is the National Phase of PCT International Application No. PCT/KR2014/010604, filed on Nov. 6, 2014, which claims priority under 35 U.S.C. 119(e) to U.S. Provisional Application No. 61/900,949, filed on Nov. 6, 2013, all of which are hereby expressly incorporated by reference into the present application.

TECHNICAL FIELD

The present invention relates to a method and device for forming a network using Bluetooth and, more particularly, to a method and device for performing a Wi-Fi Direct connection using Bluetooth.

BACKGROUND ART

Bluetooth is a short-distance radio technology standard in which a variety of types of devices are wirelessly connected at a short distance and data is exchanged. If wireless communication is to be performed between two devices using Bluetooth communication, a user performs a procedure for discovering Bluetooth devices to be communicated with each other and requesting connection between the Bluetooth devices. In embodiments of the present invention, a device may mean an apparatus or equipment.

In this case, a user may discover a Bluetooth device using a Bluetooth communication method to be used using a Bluetooth device and perform connection.

A Bluetooth communication method includes a Bluetooth Basic Rate/Enhanced Data Rate (BR/EDR) method and a Bluetooth Low Energy (LE) method, that is, a low power method. The Bluetooth BR/EDR method means a classic Bluetooth method. The classic Bluetooth method includes Bluetooth technologies from Bluetooth 1.0 to Bluetooth 2.1 using a basic rate and a Bluetooth technology which is supported from Bluetooth 2.0 and uses an enhanced data rate.

Bluetooth devices include products not having a display and/or a user interface. The complexity of connection/management/control/disconnection between a variety of types of Bluetooth devices and Bluetooth devices which belong to the variety of types of Bluetooth devices and to which similar technologies have been applied is increasing.

Alternatively, Bluetooth may have relatively high speed using relatively low energy and a low cost, but is suitable for being used in a limited space because it has a maximum transmission distance of 100 m.

A Wi-Fi Direct (hereinafter referred to as "Wi-Fi P2P") technology is mounted on TV, a laptop computer, a printer, a handheld device, such as a camera, and a portable terminal, and it provides a base for using content and services between devices through device to device (D2D) communication even without separate equipment, such as an Access Point (AP) or a router. The Wi-Fi P2P technology can provide fast transfer rate.

The Wi-Fi P2P technology, however, has a problem in that it requires not a little time taken for an initial pairing process.

Embodiments of the present invention propose methods and devices for efficiently performing a Wi-Fi P2P connection using the advantages of the Bluetooth technology.

DISCLOSURE

Technical Problem

An embodiment of the present invention provides a method using Bluetooth in performing a Wi-Fi Peer to Peer (Wi-Fi P2P) connection.

Furthermore, an embodiment of the present invention provides a method capable of performing a Wi-Fi P2P connection using the Bluetooth BR/EDR or LE technology.

Furthermore, an embodiment of the present invention provides a method capable of performing a Wi-Fi P2P connection using a Bluetooth pairing step.

Furthermore, an embodiment of the present invention provides a method capable of performing a Wi-Fi P2P connection using Bluetooth communication through which devices are connected together.

Furthermore, an embodiment of the present invention provides a method capable of providing information for a Wi-Fi P2P connection using Bluetooth communication.

Furthermore, an embodiment of the present invention provides a method capable of providing information related to Wi-Fi P2P services using Bluetooth communication.

Technical Solution

An embodiment of the present invention provides a Bluetooth connection method and device using a Bluetooth LE module and a Bluetooth BR/EDR module. More specifically, Bluetooth connection method according to an embodiment of the present invention includes transmitting a first message for Bluetooth pairing to a second device, receiving a second message for the Bluetooth pairing from the second device based on the first message, and establishing the communication link based on the received message. The first message includes the identifier (ID) of the first device, and the second message includes information related to the communication link.

Furthermore, an embodiment of the present invention provides a method, including transmitting a first message for forming a communication link through a Bluetooth link, receiving a response to the first message through the Bluetooth link, and performing a group owner negotiation procedure along with a second device through the Bluetooth link. The first message includes information related to the communication link.

Furthermore, an embodiment of the present invention provides a method, including receiving an advertising message including information related to a second device from the second device, requesting information related to the communication link from the second device based on the advertising message, receiving the information related to the communication link from the second device, and establishing the communication link based on the information related to the communication link. The information related to the communication link includes channel information.

Furthermore, an embodiment of the present invention provides a device, including a communication unit configured to transmit and receive signals externally using a wired method or a wireless method or both and a control unit operatively connected to the communication unit. The control unit transmits a first message for Bluetooth pairing to a second device, receives a second message for the Bluetooth pairing from the second device based on the first message, and establishes the communication link based on the received message. The first message includes the identifier (ID) of the first device. The second message includes information related to the communication link.

Furthermore, an embodiment of the present invention provides a device, including a communication unit configured to transmit and receive signals externally using a wired method or a wireless method or both and a control unit operatively connected to the communication unit. The control unit receives an advertising message including information related to a second device from the second device, requests information related to the communication link from the second device based on the advertising message, receives the information related to the communication link from the second device, and establishes the communication link based on the information related to the communication link. The information related to the communication link includes channel information.

Advantageous Effects

In accordance with the Wi-Fi P2P connection method using Bluetooth according to an embodiment of the present invention, a Wi-Fi P2P pairing time can be reduced using Bluetooth communication.

In accordance with the Wi-Fi P2P connection method using Bluetooth according to an embodiment of the present invention, a pairing time can be reduced by sending information for Wi-Fi P2P pairing using Bluetooth communication.

In accordance with the Wi-Fi P2P connection method using Bluetooth according to an embodiment of the present invention, high efficiency and user convenience can be provided using the fast pairing time of Bluetooth and the high transfer rate of Wi-Fi P2P because Wi-Fi P2P pairing is performed using Bluetooth communication.

In accordance with the Wi-Fi P2P connection method using Bluetooth according to an embodiment of the present invention, a Wi-Fi P2P service can be provided at higher speed by sending information about the Wi-Fi P2P service using Bluetooth communication.

DESCRIPTION OF DRAWINGS

FIGS. 10 and 11 are diagrams showing a process for performing a Wi-Fi P2P pairing procedure using Bluetooth pairing and an example of a data structure to which an embodiment of the present invention may be applied.

FIGS. 14 and 15 are diagrams showing a Wi-Fi P2P pairing process using Bluetooth Low Energy (LE) and an example of a message structure to which an embodiment of the present invention may be applied.

MODE FOR INVENTION

Figure 1:
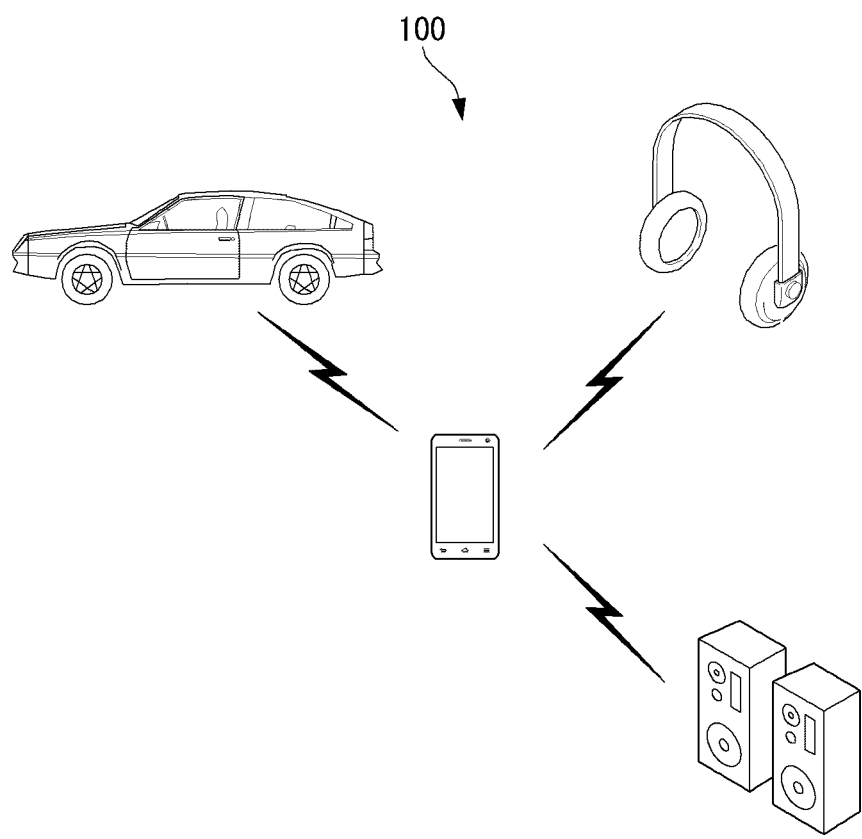
FIG. 1 is a diagram showing an example of a Bluetooth network.

The above objects, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. In describing the present invention, a detailed description of known functions or elements related to the present invention will be omitted if it is deemed to make the gist of the present invention unnecessarily vague.

Hereinafter, methods and devices related to the present invention are described in more detail with reference to the accompanying drawings. It is to be noted that the suffixes of the elements used in the following description, such as "module" and "unit", are assigned or interchangeable with each other by taking only the ease of writing this specification into consideration, but in themselves are not particularly given importance and roles.

An electronic device described in this specification may include a mobile phone, a smart phone, a notebook, a terminal for digital broadcast, a Personal Digital Assistant (PDA), a Portable Multimedia Player (PMP), a navigator, to a name few. However, those skilled in the art to which the present invention pertains may easily understand that the construction according to an embodiment described in this specification may also be applied to fixed terminals, such as digital TV and desktop computers, other than the case where the construction can be applied to only a mobile terminal.

A signal described in this specification may be transmitted in a frame form in addition to a message form. Furthermore, in an embodiment of the present invention, a network other than Bluetooth may also be applied to other network technologies, such as WiGig, Wi-Fi infrastructure, Zigbee, and ANT+, in addition to Wi-Fi.

FIG. 1 is a diagram showing an example of a Bluetooth network.

Referring to FIG. 1, Bluetooth may provide services through pairing with various electronic devices (100).

Bluetooth is a Radio Frequency (RF) specification proposed for the transmission of a short range, point to multipoint voice and data.

Bluetooth may perform transmission through a solid and nonmetallic material. The transmission range of Bluetooth is 10 cm to 10 m, but may be extended to 100 mm by increasing transmission power. Bluetooth is based on a radio link of a low cost and short range and facilitates an ad hoc connection in fixed and mobile communication environments.

Bluetooth uses a 2.45 GHz frequency, that is, an ISM band that is the same as that of the WLAN standards 802.11b/g. Bluetooth devices may perform wireless communication through processes, such as discovery/selection/pairing for surrounding Bluetooth devices.

Furthermore, Bluetooth may have relatively high speed using relatively low energy and a low cost, but is suitable for being used in a limited space because it has a maximum transmission distance of 100 m.

In Bluetooth 2.0 version, an Enhanced Data Rate (EDR) standard was added to guarantee a certain level of communication quality, thereby making Bluetooth popular rapidly. As the use of Bluetooth is generalized, the use of a portable terminal having the Bluetooth function is generalized. In particular, short-distance data communication using Bluetooth is generalized. For example, music can be heard wirelessly through Bluetooth communication with a Bluetooth headset.

Furthermore, Bluetooth becomes frequently used. For example, music is played back through a smart phone-vehicle speaker association using Bluetooth or through a Bluetooth docking speaker-smart phone association.

Furthermore, a Wireless Personal Area Network (WPAN) can maximize energy efficiency because a small amount of data can be transmitted between devices in environments, such as a home network, a small office, and a vehicular network.

Furthermore, the WPAN provides a real-time A/V Streaming service through an electronic device, such as a headset, in a limited bandwidth and is widely used because it can maximize energy efficiency even when a dependent remote control function is performed.

Bluetooth is not suitable for sending and receiving a large amount of data due to such characteristics.

Compared with the WPAN, such as the Bluetooth, a Wi-Fi technology has characteristics, such as a broad band, high speed, and a long range. In the Wi-Fi technology, however, 10 seconds~several tens of seconds are taken for an initial pairing procedure, which may become problematic in terms of performance of the Wi-Fi technology and user convenience.

Accordingly, there is proposed a method for performing a Wi-Fi P2P pairing procedure using advantages of the Bluetooth.

Figure 2:
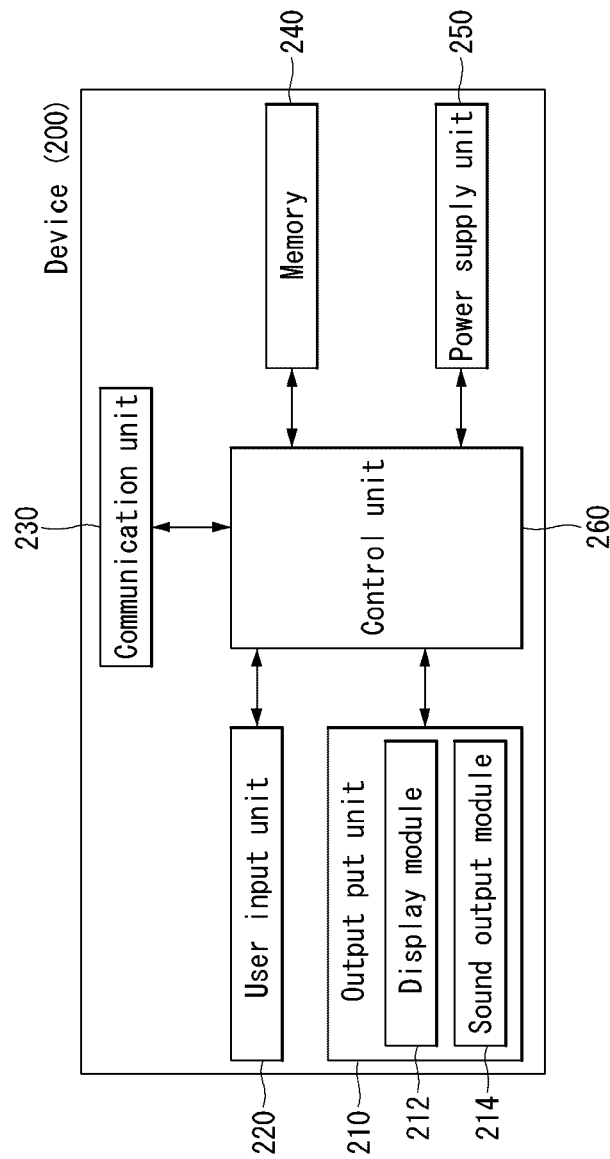
FIG. 2 is a diagram showing an example of the internal block of a device to which an embodiment of the present invention may be applied.

FIG. 2 is a diagram showing an example of the internal block of a device to which an embodiment of the present invention may be applied.

The device 200 may refer to all of electronic devices capable of supporting a Bluetooth function.

The device 200 directly communicates with another device and may receive data and notify another device of the results of processing of the received data.

Furthermore, the device 200 may receive a request for data from another device and send the requested data to another device. To this end, the device 200 may send a notification or indication message to another device and receive a confirm message as a response to the notification or indication message.

The device 200 may include an output unit 210, a user input unit 220, a communication unit 230, memory 240, a power supply 250, and a control unit 260.

The communication unit, the user input unit, the output unit, the control unit, the memory, and the power supply are operatively connected together in order to perform methods proposed according to embodiments of the present invention.

The elements shown in FIG. 2 are not essential, and a device having a large number or smaller number of elements than the elements of FIG. 2 may be implemented.

The output unit 210 generates output related to visual, auditory, or tactile senses and may include a display module 212 and a sound output module 214.

The display module 212 displays information processed by the device. For example, if the device is call mode, the display module displays a User Interface (UI) or Graphic User Interface (GUI) related to a call. If the device is video telephony mode or photographing mode, the display module displays a photographed or/and received image, a UI, or a GUI.

The display module 212 may include at least one of a liquid crystal display, a thin film transistor liquid crystal display, an organic light-emitting diode, a flexible display, and a 3D display.

The sound output module 214 may output audio data received from the communication unit 230 or stored in the memory 240 in incoming call mode, communication mode, recording mode, voice recognition mode, and broadcast reception mode. The sound output module 214 outputs sound signals related to a function (e.g., a received call sound and a received message sound) performed in the device. The sound output module 214 may include a receiver, a speaker, and a buzzer.

The user input unit 220 generates input data for controlling the operations of the device by a user. The user input unit 220 may include a key pad dome switch, a touch pad (resistive/capacitive), a jog wheel and/or a jog switch.

The communication unit 230 may include one or more modules that enable wireless communication between a device and a wireless communication system or between a device and a network in which the device is placed. For example, the communication unit 230 may include a broadcast reception module (not shown), a mobile communication module (not shown), a wireless Internet module (not shown), and a short-distance communication module (not shown).

The communication unit 230 may also be called a transmission/reception unit.

The mobile communication module exchanges radio signals with at least one of a base station, an external terminal and a server over a mobile communication network. The radio signal may include a variety of types of data according to the transmission and reception of voice call signals, video telephony call signals, or text/multimedia messages.

The wireless Internet module refers to a module for wireless Internet access. The wireless Internet module may be internal or external to a device. A Wireless LAN (WLAN) (Wi-Fi), a Wireless Broadband (WiBro), a World Interoperability for Microwave Access (WiMax), and High Speed Downlink Packet Access (HSPDA) may be used as the wireless Internet technology.

The device may perform a Wi-Fi Peer to Peer (P2P) connection to another device through the wireless Internet module. A streaming service may be provided between devices through such a Wi-Fi P2P connection. The device may send and receive data or may be connected to a printer and provide a printing service through the Wi-Fi P2P connection.

In an embodiment of the present invention, in performing a Wi-Fi P2P connection, the device 200 can improve Wi-Fi P2P pairing speed by sending information for the Wi-Fi P2P connection to another device through a Bluetooth pairing procedure or using Bluetooth that has already been connected.

The memory 240 is a medium for storing a variety of types of information of the device. The memory is connected to the control unit 260 and may store programs, applications, common files, and input/output data for the operations of the control unit 260.

The memory 240 may include at least of a flash memory type, a hard disk type, a multimedia card micro type, card type memory (e.g., SD or XD memory), Random Access Memory (RAM), Static Random Access Memory (SRAM), Read-Only memory (ROM), Electrically Erasable Programmable Read-Only Memory (EEPROM), Programmable Read-Only Memory (PROM), magnetic memory, a magnetic disk and an optical disk. The device may also operate in relation to web storage that performs the storage function of the memory 240 on the Internet.

The power supply 250 refers to a module for being supplied with external power or internal power and supplying power for the operations of the elements under the control of the control unit 260.

The control unit 260 refers to a module for controlling an overall operation of the device 200 and may perform control so that a request to send a message or the processing of a received message is performed through a Bluetooth interface and another communication interface.

The control unit 260 may be called a controller, a microcontroller, or a microprocessor and may be implemented by hardware, firmware, software or a combination of them.

The control unit 260 may include Application-Specific Integrated Circuits (ASICs), other chipsets, logic circuits and/or data processing devices.

Figure 3:
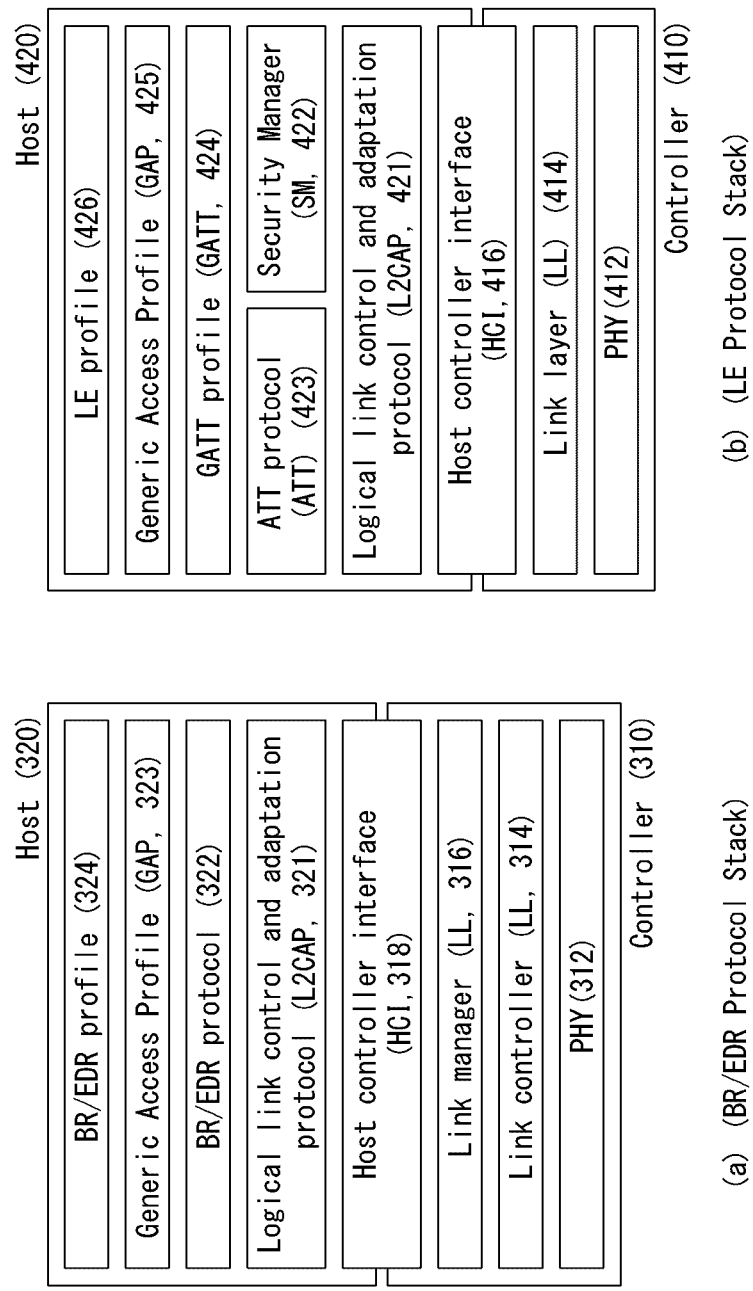
FIG. 3 is a diagram showing a protocol stack provided for Bluetooth communication to which an embodiment of the present invention may be applied.

FIG. 3 is a diagram showing a protocol stack provided for Bluetooth communication to which an embodiment of the present invention may be applied.

FIG. 3(*a*) is a diagram showing the structure of the BR/EDR protocol stack according to a Bluetooth BR/EDR method, and FIG. 3(*b*) is a diagram showing the structure of an LE protocol stack according to the Bluetooth LE method.

More specifically, the Bluetooth protocol stack may include host protocols 320 and 420 on the upper side of respective Host Controller Interfaces (HCI) 318 and 416 and controller protocols 310 and 410 on the upper side of the respective HCIs 318 and 416.

The controllers 310 and 410 correspond to Bluetooth modules. The hosts 320 and 420 are connected to the Bluetooth modules, that is, the controllers 310 and 410, control the Bluetooth modules, and perform operations. A PC, a PDA, or a smart phone may become a host, and a processor included in a system may become a host according to circumstances.

In an embodiment of the present invention, the Bluetooth module may include a Bluetooth LE module and a Bluetooth BR/EDR module.

(a) The BR/EDR protocol stack may include a BR/EDR profile 324, a Generic Access Profile (GAP) 323, a BR/EDR protocol 322, a logical link control and adaptation protocol (L2CAP) 321, and a link manager (LL) 316, a link controller (LL) 314, and a physical layer (PHY) 312 included in the controller 310.

(b) The LE protocol stack may include an LE profile 426, a Generic Access Profile (GAP) 425, a GATT profile (GATT) 424, an ATT protocol (ATT) 423, a Security Manager (SM) 422, a logical link control and adaptation protocol (L2CAP) 421, and a link layer (LL) 414 and a physical layer (PHY) 412 which are included in the controller 410. The LE protocol stack is different from the BR/EDR protocol stack.

The controllers 310 and 410 and the hosts 320 and 420 are connected by the HCIs 318 and 416, respectively.

The hosts 320 and 420 may provide commands and data to the controllers 310 and 410 through the HCIs 318 and 416. The controllers 310 and 410 may provide events and data to the hosts 320 and 420 through the HCIs 318 and 416.

The PHY layer 412 of (b) the LE protocol stack is a lay for sending and receiving radio signal and may include Gaussian Frequency Shift Keying (GFSK) modulation and 40 Radio Frequency (RF) channels.

The link layer 414 may generate connection between devices by performing advertising and scanning functions using three advertising channels and provide a function for exchanging data packets through 37 data channels.

The host 420 may multiplex various protocols and profiles provided by higher Bluetooth using the logical link control and adaptation protocol (hereinafter referred to as "L2CAP") 421.

The L2CAP 421 may provide a single bi-directional channel for sending data to a specific protocol or profile and uses three fixed channels in the Bluetooth LE method.

The three fixed channels may be used for a signaling channel, the security manager 422, and the ATT protocol (hereinafter referred to as "ATT") 423, respectively.

In a Bluetooth Basic Rate/Enhanced Data Rate (BR/EDR), a dynamic channel is used, and a protocol service multiplexer, retransmission, and streaming mode may be supported.

The security manager (hereinafter referred to as "SM") 422 is a protocol for providing device pairing and a key distribution.

The ATT 423 is used for communication between a server and a client and has an attribute handle that enables a client to access attributes included in a server. Protocol operation commands include "Request", "Response", "Command", "Notification", "Indication", and "Confirm."

Request and Response messages: a Request message is a message for allowing a client device to request specific information from a server device. A Response message is a response message for a Request message and refers to a message transmitted from a server device to a client device.

Command message: a Command message is a message transmitted from a client device to a server device in order to indicate a command of a specific operation. A server device does not send a response to a Command message to a client device.

Notification message: a Notification message is a message transmitted from a server device to a client device for a notification, such as an event. A client device does not send a Confirm message for a Notification message to a server device.

Indication and Confirm messages: Indication and Confirm messages are messages transmitted from a server device to a client device for a notification, such as an event. Unlike in a Notification message, a client device sends a Confirm message for an Indication message to a server device.

The GATT profile (hereinafter referred to as "GATT") 424 is a layer newly implemented for a Bluetooth LE technology, and it defines a procedure for obtaining corresponding information using the S/W elements of a Bluetooth device below and messages defined in the ATT protocol. The procedure may define the configuration of discovering, reading, writing, notifying, and indicating characteristics.

Service: define the basic operation of a device through a combination of behaviors related to data.

Include: define the relationship between services.

Characteristics: data values used in a service.

Behavior: a computer-readable format defined as a Universally Unique Identifier (UUID).

The GAP 425 defines a scheme for discovering and connecting defined devices and providing information to a user and may provide privacy.

The LE profile 426 includes profiles dependent on the GATT 424 and is chiefly applied to a low energy device.

Embodiments of the present invention propose methods and devices for a new network, for example, an efficient Wi-Fi P2P connection by sending information for Wi-Fi P2P pairing using the (a) BR/EDR protocol stack or (b) LE protocol stack of Bluetooth, which has low power consumption and a relatively fast pairing procedure.

Figure 4:
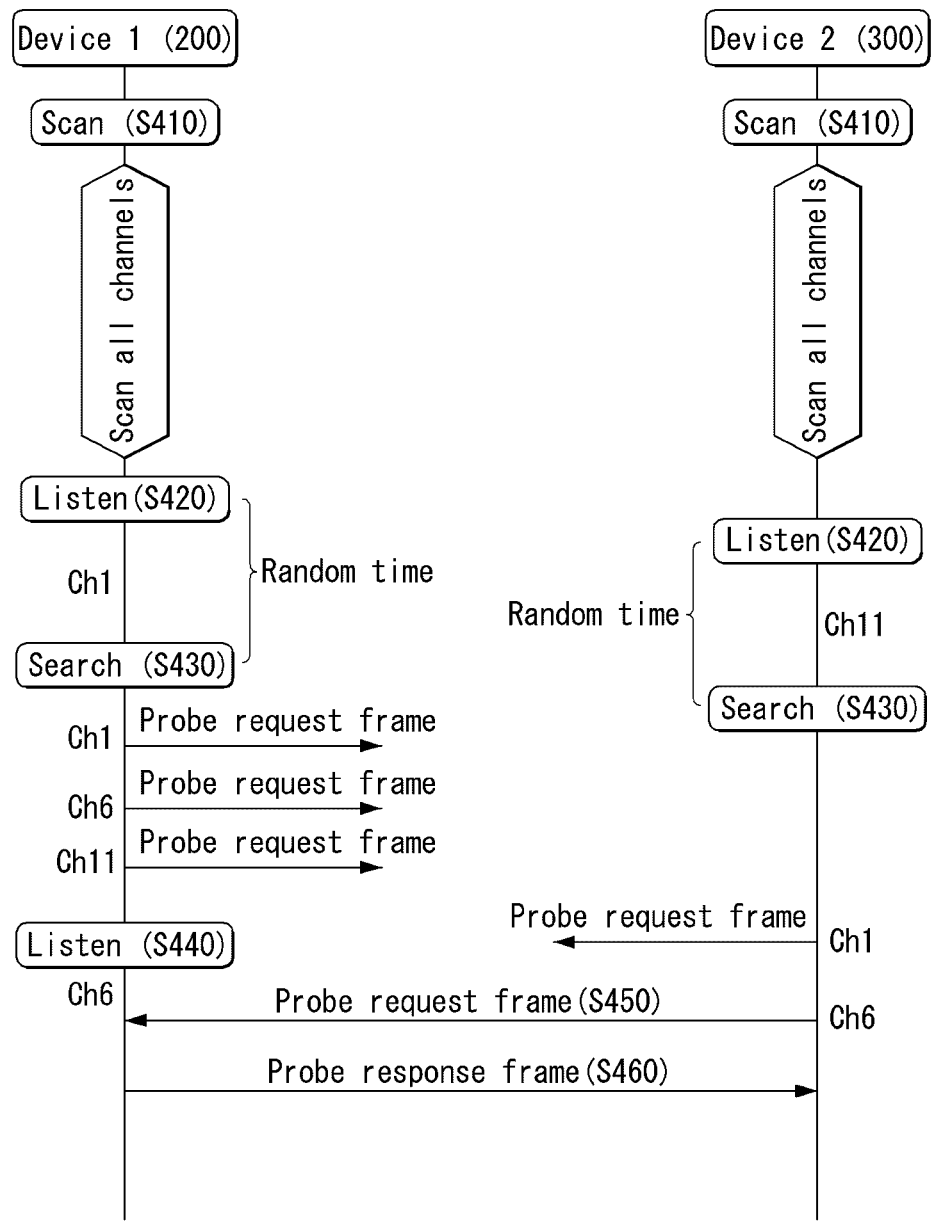
FIG. 4 is a flowchart illustrating a device discovery process of Wi-Fi Direct.

FIG. 4 is a flowchart illustrating a device discovery process of Wi-Fi Direct.

The device discovery procedure is performed by a process for discovering surrounding devices capable of a Wi-Fi P2P connection and changing a channel to a channel for providing Wi-Fi P2P services to a selected device of the discovered devices.

More specifically, the device discovery procedure may be divided into a scan phase for discovering an operation channel or surrounding P2P groups or P2P devices and a find phase for discovering surrounding devices in a social channel. In the find phase, devices may have a search state in which a device sends a probe request frame in the social channel and a listen state in which a device receives a probe request frame from another device.

The probe request frame may include a Peer to Peer Information Element (P2P IE), a P2P Wildcard SSID element, Wildcard BSSID and address information, and a WSC Information Element (WSC IE).

In the scan phase S410, a device1 200 and a device2 300 may scan surrounding another device or P2P group or may search for an optimum operation channel for forming a P2P group.

In the scan phase S410, the device1 200 and the device2 300 may obtain information related to surrounding devices or networks by scanning all of channels. In such a scan phase, the device is unable to respond to a probe request frame, and all of devices attempting to perform a P2P connection may be scanned.

When the scan phase S410 is terminated, the device1 200 and the device2 300 may operate as the listen state S420 of the find phase.

In the listen state S420, the device1 200 and the device2 300 may stay in a specific listen channel in order to form a P2P group if they do not belong to a P2P group. The listen channel is a selected channel of social channels.

The social channels mean three of channels within a 2.4 GHz band.

In the listen state S420, the device1 200 and the device2 300 may search for probe response frames as responses to the probe request frame of other devices present in the same social channel.

In the search state S430, the device1 200 and the device2 300 may send probe request frames in all of social channels for a P2P connection.

The device1 200 and the device2 300 may repeatedly operate in the listen state S420 and the search state S430. Time during which the device1 200 and the device2 300 are present in the listen state S420 may be randomly determined.

In the repeated operation, if the device1 200 and the device2 300 are present in the listen state S420 and the search state S430, respectively, or the search state S430 and the listen state S420, respectively, in the same social channel, a P2P connection is possible.

In FIG. 4, the device 2 300 may send a probe request frame to the device 1 200 through a social channel in the search state S430.

The probe request frame may be transmitted for each social channel. The device 1 200 can respond to the probe request frame only when it is in the same channel. In FIG. 4, the device 2 300 may send a probe request frame in a channel 1 and a channel 6 (S450). The device 1 200 may send a probe response frame to the device 2 300 as a response to the probe request frame transmitted by the device 2 300 in the channel 6 (S460).

The probe request frame may be transmitted in a message format and includes information shown in Table 1 below.

TABLE 1

| ORDER | INFORMATION ELEMENT |
|---|---|
| | WSC IE |
| Last | P2P IE |

In Table 1, the WSC IE may include information shown in Table 2 below.

TABLE 2

| ATTRIBUTES | REQUIRED/OPTIONAL |
|---|---|
| Device Name | Required |
| Primary Device Type | Required |
| Device Password ID | Required |
| Request Device Type | Optional |

In Table 2, the Device Name may mean the name of a device that has sent the probe request frame. The Primary Device Type may mean the type of a device that has sent the probe request frame. The Device Name, the Primary Device Type, and the Device Password ID are information that needs to include the probe request frame, and the Request Device Type is an optionally included element.

In Table 1, the P2P IE is information for a P2P connection and may include information shown in Table 3 below.

TABLE 3

| FIELD | SIZE (OCTETS) | VALUE | DESCRIPTION |
|---|---|---|---|
| Element ID | 1 | 0xDD | IEEE 802.11 vendor specific usage |
| Length | 1 | Variable | |
| OUI | | 50 6F 9A | WFA specific OUI |
| P2P Attributes | variable | | |

Table 3 shows common formats of P2P IE. The formats of Table 1 to Table 3 are formats used in the probe request frame, the probe response frame, a group owner negotiation request frame, a group owner negotiation response frame, and a group owner negotiation result frame in common. The P2P Attributes are different depending on the type of frame or message transmitted by a device.

Table 4 below shows information included in P2P Attributes.

TABLE 4

| FIELD | SIZE (OCTETS) | VALUE | DESCRIPTION |
|---|---|---|---|
| Attribute ID | 1 | Variable | Identifying the type of P2P attribute |
| Length | 2 | Variable | |
| Attribute body field | Variable | | |

In Table 4, the Attribute ID is a field indicative of the type of P2P attributes, and the Attribute body field may indicate information included in each of P2P attributes.

The probe request frame may include P2P attributes shown in Table 5 below.

TABLE 5

| ATTRIBUTES | ATTRIBUTE ID |
|---|---|
| P2P Capability | 2 |
| P2P Device ID | 3 |
| Listen Channel | 6 |
| Extended Listen Timing | 8 |
| Operating Channel | 17 |

In Table 5, the Listen Channel includes channel information of a device in the listen state and information related to Operating Class. The Extended Listen Timing may include information related to the time of a valid listen state. The Operating Channel may include information related to an operation channel scanned through the scan phase.

Information included in the P2P Attributes of the probe response frame transmitted by the device 2 620 as a response to the probe request message is shown in Table 6 below.

TABLE 6

| ATTRIBUTES | ATTRIBUTE ID |
|---|---|
| P2P Capability | 2 |
| Extended Listen Timing | 8 |
| Notice of Absence | 12 |
| P2P Device Info. | 13 |
| P2P Group Info. | 14 |

The Notice of Absence may be included if a group owner provides notification of a Notice of Absence Schedule through a beacon frame.

The device 1 610 that has received the probe response frame may search for the device 2 620 and attempt a P2P connection to the device 2 620.

In such a device discovery procedure, however, only when devices are present in different states, that is, the listen state and the search state in the same channel in an initial pairing procedure, they may be connected. Accordingly, a long time may be taken because such a procedure has to depend on a specific probability.

Accordingly, in order to solve such a problem, methods and devices for efficiently performing a P2P connection are described below.

Figure 5:
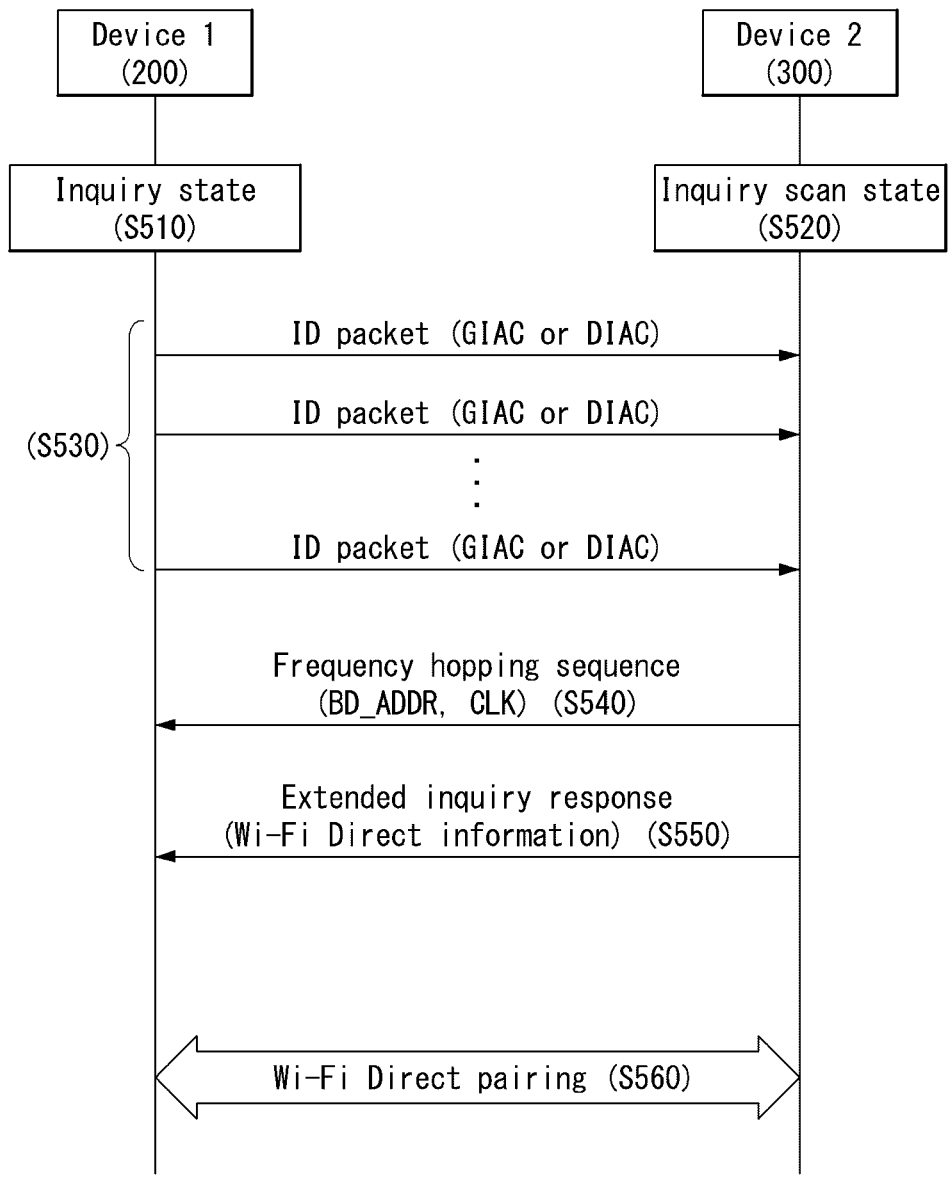
FIGS. 5 and 6 are diagrams showing a process for sending information for Wi-Fi P2P pairing through a Bluetooth pairing process and an example of a data structure to which an embodiment of the present invention may be applied.
Figure 6:
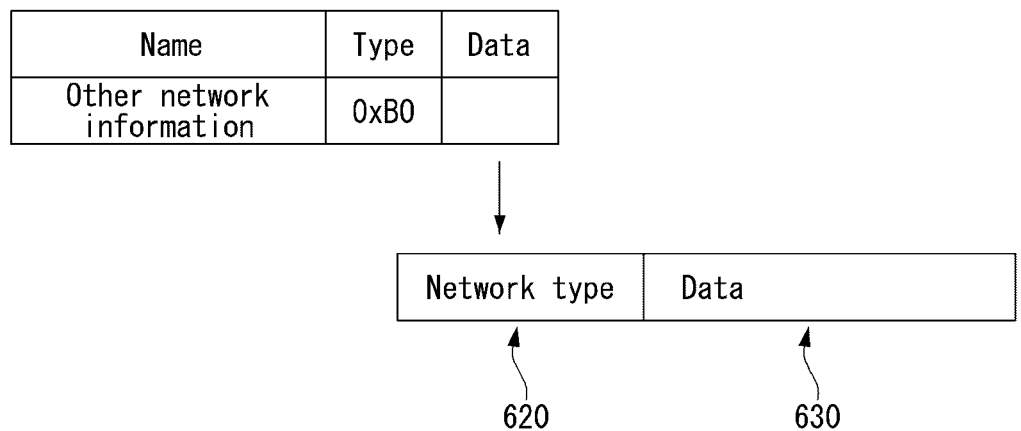

FIGS. 5 and 6 are diagrams showing a process for sending information for Wi-Fi P2P pairing through a Bluetooth pairing process and an example of a data structure to which an embodiment of the present invention may be applied.

Referring to FIG. 5, the time taken for a Wi-Fi P2P pairing procedure can be reduced by sending information for Wi-Fi P2P pairing in a Bluetooth pairing phase.

More specifically, a device 1 200 and a device 2 300 may perform an inquiry phase for a Bluetooth connection. The inquiry means a phase for discovering surrounding connected Bluetooth devices.

The device 1 200 may become an inquiry state S510 in order to discover surrounding connectable devices. The device 2 300 may become an inquiry scan state S520 in order to receive ID packets transmitted by surrounding devices in the inquiry state.

The device 1 200 may continuously send the ID packets in order to discover surrounding connectable devices in the inquiry state (S530).

The ID packet may be General Inquiry Access Code (GIAC) or Dedicated Inquiry Access Code (DIAC).

After receiving GIAC or DIAC, that is, the ID packet transmitted by the device 1 200, the device 2 300 may send a Frequency Hopping Sequence (FHS) to the device 1 200 for the purpose of Bluetooth pairing with the device 1 200 (S540). For example, if there is data to be transmitted, the device 2 300 may send an Extended Inquiry Response (hereinafter referred to as an "EIR") to the device 1 200, if necessary.

In this case, the device 2 300 may include information about the device 2 300 for Wi-Fi P2P pairing in the EIR packet and send the EIR packet to the device 1 200 (S550).

If such a method is used, the device 1 200 and the device 2 300 is

FIG. 6 shows an example of the structure of the EIR packet. More specifically, the EIR packet may include Name, Type, and Data fields. The Data field may include network type and data fields.

The network type field may include a network type 620 indicating that information included in the EIR packet included is information about which network and a data (630) field indicative of information about the network type.

For example, in the case of the network type 620, if the network type 620 has a value of 1, it may indicate Wi-Fi Direct. If the network type 620 has a value of 2, it may indicate a Ultra Wideband (UWB).

The Data field may have values shown in Table 7 below.

TABLE 7

| EID | TYPE | VALUE |
|---|---|---|
| 0x01 | Int | Listen Channel |
| 0x02 | Int | Channel Class |
| 0x03 | String | SSID |
| 0x04 | Int | P2P Capability |
| 0x05 | Int | Configuration Method (WSC IE) |
| 0x06 | Int | WPS Request Type (Register/Enrollee) |
| 0x07 | Int | Device Password ID |
| 0x08 | Variable | Supported Rate |
| 0x09 | 6 Octets | Peer IEEE MAC Address |
| 0x0A | 6 Octets | BSSID IEEE MAC Address |

The device 1 200 that has received the EIR packet may perform a Wi-Fi Direct pairing procedure along with the device 2 300 through information included in the EIR packet (S560).

In the Bluetooth Inquiry procedure, the device 1 200 and the device 2 300 need to perform a Wi-Fi Direct pairing procedure based on information included in the EIR packet because they are unable to exchange data other than the EIRs.

In accordance with the present embodiment, there are advantages in that information for a Wi-Fi Direct connection can be obtained in advance through a Bluetooth pairing preparation phase and a Wi-Fi Direct pairing procedure can be reduced because a Bluetooth pairing phase is faster than a Wi-Fi Direct pairing phase.

In the present embodiment, a Wi-Fi Direct connection is only an example, and thus another piece of network connection information may be transmitted in the Bluetooth pairing phase.

Figure 7:
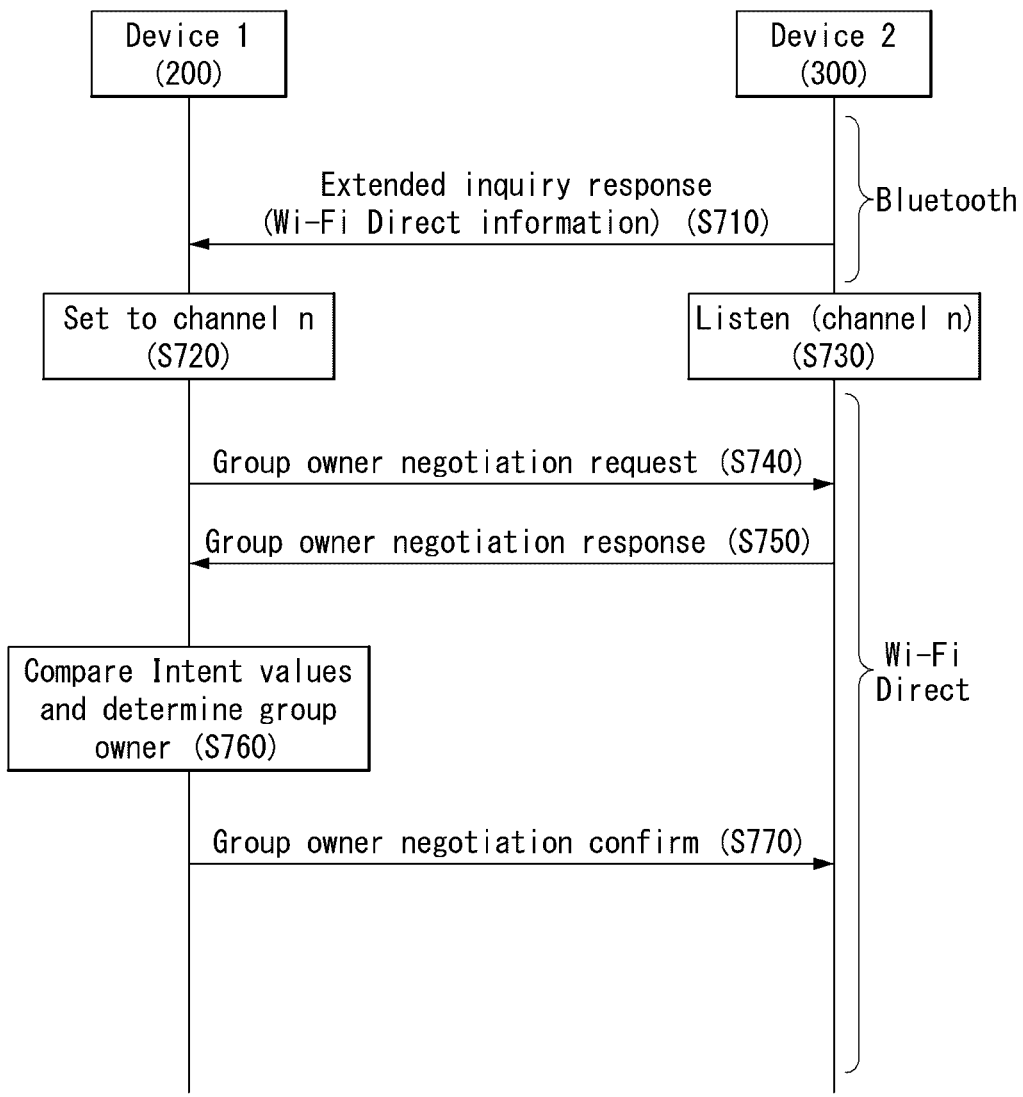
FIG. 7 is a flowchart illustrating a process for determining a group owner for Wi-Fi P2P pairing using a Bluetooth pairing process to which an embodiment of the present invention may be applied.

FIG. 7 is a flowchart illustrating a process for determining a group owner for Wi-Fi P2P pairing using a Bluetooth pairing process to which an embodiment of the present invention may be applied.

As described with reference to FIG. 5, the device 1 200 that has received the EIR packet may perform a separate group owner negotiation procedure after the Bluetooth inquiry phase in order to determine a group owner of Wi-Fi Direct because it is unable to exchange other data due to the nature of the Bluetooth inquiry procedure.

More specifically, as described with reference to FIG. 6, the device 1 200 may receive an EIR packet through a Bluetooth pairing procedure (S710).

The device 1 200 may set its own Wi-Fi channel as "n" based on a current listen channel known to the device 1 200 through the received EIR packet (S720). The device 2 300 may maintain the current listen channel to "n" (S730).

If the device 2 300 changes its own listen channel, the device 1 200 may repeatedly perform the procedure of FIG. 5.

When channel set-up is completed, the device 1 200 may send a group owner negotiation request message of Wi-Fi Direct to the device 2 300 based on information, such as a data rate, a current listen channel, and a configuration method obtained through the EIR packet of FIG. 6 (S740).

The group owner negotiation request may have a frame format in addition to a message format and may be transmitted.

The group owner negotiation request message may include the P2P IE of Table 1. The P2P IE may include information of Table 8 below.

TABLE 8

| ATTRIBUTES | ATTRIBUTE ID |
| --- | --- |
| P2P Capability | 2 |
| Group Owner Intent | 4 |
| Configuration Timeout | 5 |
| Listen Channel | 6 |
| Extended Listen Timing | 8 |
| Intended P2P Interface Address | 9 |
| Channel List | 11 |
| P2P Device Information | 13 |
| Operation Channel | 17 |

The P2P Capability indicates the characteristics of a formed P2P group, and the Group Owner Intent may include information of Table 9 below.

TABLE 9

| FIELD | SIZE (OCTETS) | VALUE |
| --- | --- | --- |
| Attribute ID | 1 | 4 |
| Length | 2 | 1 |
| G.O Intent | 1 | variable |

The GO Intent field includes information for determining a group owner and may include information of Table 10 below.

TABLE 10

| BIT(S) | INFORMATION | VALUE |
| --- | --- | --- |
| 0 | Random value | 0 or 1 |
| 1-7 | Intent | 0-15 |

The Intent value is a value for determining a group owner and may have a value of 0 to 15. A group owner is determined by comparing an Intent value included in the group owner negotiation request message with an Intent value included in a group owner negotiation response message. The Random value is randomly determined between 0 and 1. If the Intent values are the same, a group owner may be determined by comparing one random value with the other random value.

The Configuration Timeout may indicate a maximum time taken to proceed to a Wi-Fi provisioning phase after the group owner is determined.

The device 1 610 may receive a group owner (G.O) negotiation response message from the device 2 620 as a response to the group owner (G.O) negotiation request message (S750).

The group owner (G.O) negotiation response message may include the Peer to Peer Information Element (P2P IE) and the WSC Information Element (WSC IE). The P2P IE may include information of Table 11 below.

TABLE 11

| ATTRIBUTES | ATTRIBUTE ID |
| --- | --- |
| Status | 0 |
| P2P Capability | 2 |
| Group Owner Intent | 4 |
| Configuration Timeout | 5 |
| Operation Channel | 17 |
| Intended P2P Interface Address | 9 |
| Channel List | 11 |
| P2P Device Information | 13 |
| P2P Group ID | 15 |

The Status indicates whether the device 2 300 may perform a group owner negotiation and may be indicated by a success or failure.

The group owner (G.O) negotiation request message and the group owner (G.O) negotiation response message have a WSC IE other than the P2P IE. The WSC IE may include information of Table 12 below.

TABLE 12

| ATTRIBUTE | REQUIRED/OPTIONAL | ALLOWED VALUE |
| --- | --- | --- |
| Version | Required | 0x10 = version 1.0, 0x11 = version 1.1, etc. |
| Device Password | Required | |
| <Other> | Optional | |

The device 1 200 that has obtained information included in the group owner (G.O) negotiation request message and the group owner (G.O) negotiation response message may determine a group owner using an Intent value and a Random value included in the group owner (G.O) negotiation request message and the group owner (G.O) negotiation response message (S760).

If the group owner is determined or a group owner is not determined, the device 1 200 may send a group owner (G.O) negotiation confirm message to the device 2 620 (S770).

The group owner (G.O) negotiation result frame may include information of Table 13 below.

TABLE 13

| ATTRIBUTES | ATTRIBUTE ID |
|---|---|
| Status | 0 |
| P2P Capability | 2 |
| Operation Channel | 17 |
| Channel List | 11 |
| P2P Group ID | 15 |

In Table 13, the Status indicates whether the group negotiation procedure is a success or a failure. If a group owner is determined in the procedure, the Status may be set as a value indicative of a success. If a group owner is not determined, the Status may be set as a value indicative of a failure.

The procedure for determining the group owner may be terminated when the group owner (G.O) negotiation result frame is transmitted if the group owner has been determined or has not been determined. If a group owner has not been determined, the same procedure may be performed again.

An embodiment of the present invention proposes a method for reducing a pairing time by reducing a Wi-Fi Direct pairing procedure through Bluetooth. Accordingly, a Bluetooth procedure is not stopped due to a Wi-Fi Direct operation. That is, Bluetooth is performed regardless of a Wi-Fi operation.

In another embodiment of the present invention, however, Bluetooth pairing may be stopped when Wi-Fi Direct pairing is completed through the Wi-Fi Direct procedure.

The device 1 200 and the device 2 300 that have completed the group owner negotiation procedure may continue to perform a pairing phase in an operation channel according to a Wi-Fi Direct standard technology.

In yet another embodiment of the present invention, if the Wi-Fi modules of the device 1 200 or the device 2 300 or both are disabled, the procedure of FIGS. 5 and 7 may be performed after the Wi-Fi modules of the device 1 200 or the device 2 300 or both are enabled.

Figure 8:
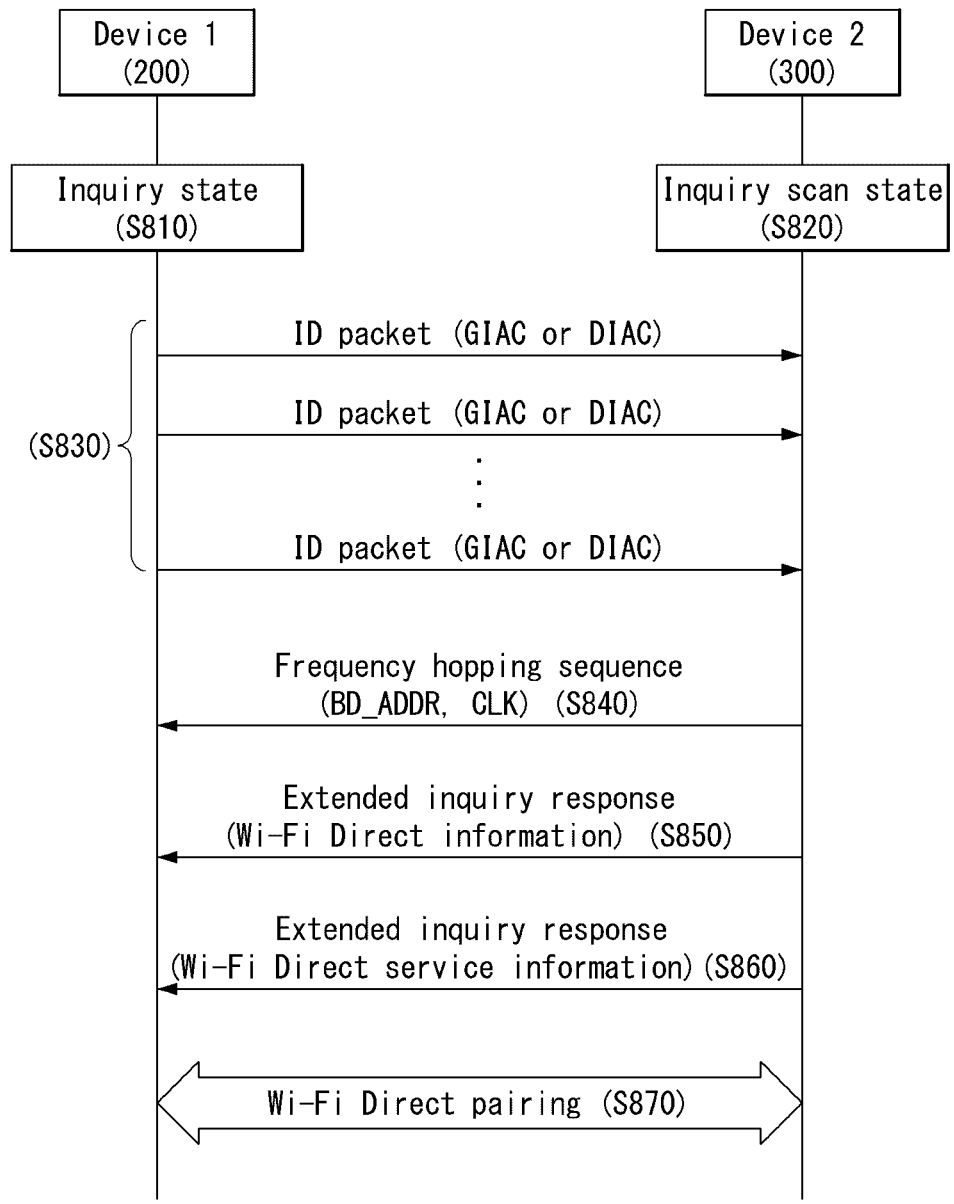
FIGS. 8 and 9 are diagrams showing a process for sending information for Wi-Fi P2P services through a Bluetooth pairing process and an example of a data structure to which an embodiment of the present invention may be applied.
Figure 9:
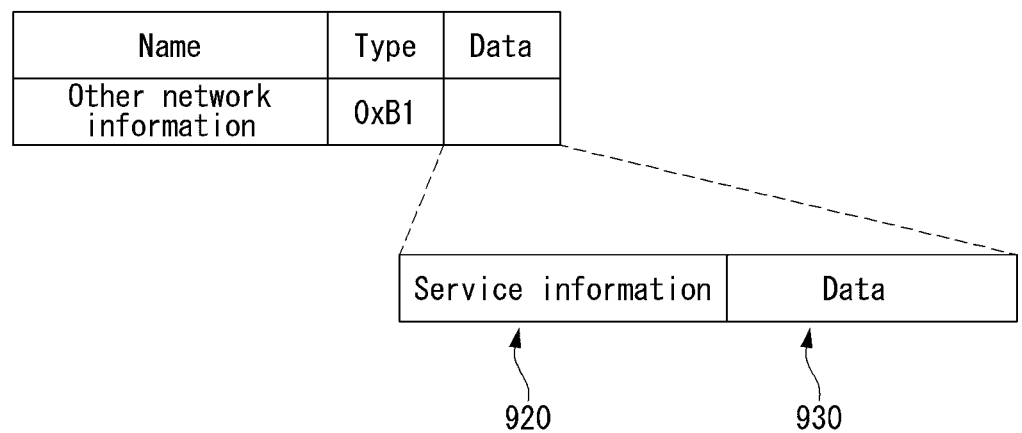

FIGS. 8 and 9 are diagrams showing a process for sending information for Wi-Fi P2P services through a Bluetooth pairing process and an example of a data structure to which an embodiment of the present invention may be applied.

In FIG. 8, in addition to the procedure of FIG. 5, the time taken to provide a service after Wi-Fi P2P pairing can be reduced when the device 1 200 sends service information to be provided through Wi-Fi P2P along with the EIR packet.

Miracast and WFDS-SEND services are described as examples below. The Miracast is a radio display technology and refers to a technology for expanding and applying a moving image or music in a mobile device to a large-scale display, such as TV or a monitor.

The WFDS-SEND refers to a technology for sending a file using a Wi-Fi Direct service.

S810 to S850 of FIG. 8 are the same as S510 to S550 of FIG. 5, and thus a description thereof is omitted.

After receiving information for Wi-Fi P2P pairing from the device 2 300, the device 1 200 may receive an EIR packet, including Wi-Fi Direct service information, from the device 2 300 (S860).

An extended inquiry information packet (or an Extended Inquiry Response (hereinafter referred to as an "EIR") 910 including Wi-Fi Direct service information of FIG. 9 has a packet structure similar to that of FIG. 6.

The EIR packet 910 of FIG. 9 may be different from the EIR packet 610 of FIG. 6 in a portion in which a Service Type field 920 and a Data field 930 for the Service Type field 920 are included in a Data field.

The Service Type field 920 may indicate that which service will be provided through the Wi-Fi Direct. For example, if the value of the Service Type is 1, it may indicate a Miracast service. If the value of the Service Type is 2, it may indicate a WFDS-SEND service.

The Data field 930 may include information according to the Service Type and may have values of Table 14 or 15 below.

Table 14 shows values which may be included in the Data field if the service is Miracast.

TABLE 14

| EID | VALUE |
|---|---|
| 0x01 | IP Address |
| 0x02 | Subnet Mask |
| 0x03 | RTP Port |
| 0x04 | Codec Info. |
| 0x05 | Video Format |
| 0x06 | Content Protection |
| 0x07 | Coupled_Sink |
| 0x08 | UIBC Capability |
| 0x09 | IDR Request |
| 0x0A | DLNA UUID |

Table 15 below shows values which may be included in the Data field of the service is WFDS-SEND.

TABLE 15

| EID | VALUE |
|---|---|
| 0x01 | IP Address |
| 0x02 | Subnet Mask |
| 0x03 | Transport Protocol (TCP or UDP) |
| 0x04 | Port |
| 0x05 | Service Info. |
| 0x06 | File name |
| 0x07 | Sharable |
| 0x08 | File Size |
| 0x09 | Transmission Timeout |
| 0x0A | DLNA UUID |

The device 1 200 that has received the EIR packet may perform a Wi-Fi Direct pairing procedure along with the device 2 300 using information included in the EIR packet (S870).

In the Bluetooth Inquiry procedure, the device 1 200 and the device 2 300 need to perform a Wi-Fi Direct pairing procedure based on information included in the EIR packet because they are unable to exchange other data other than the EIR packet.

Figure 10:
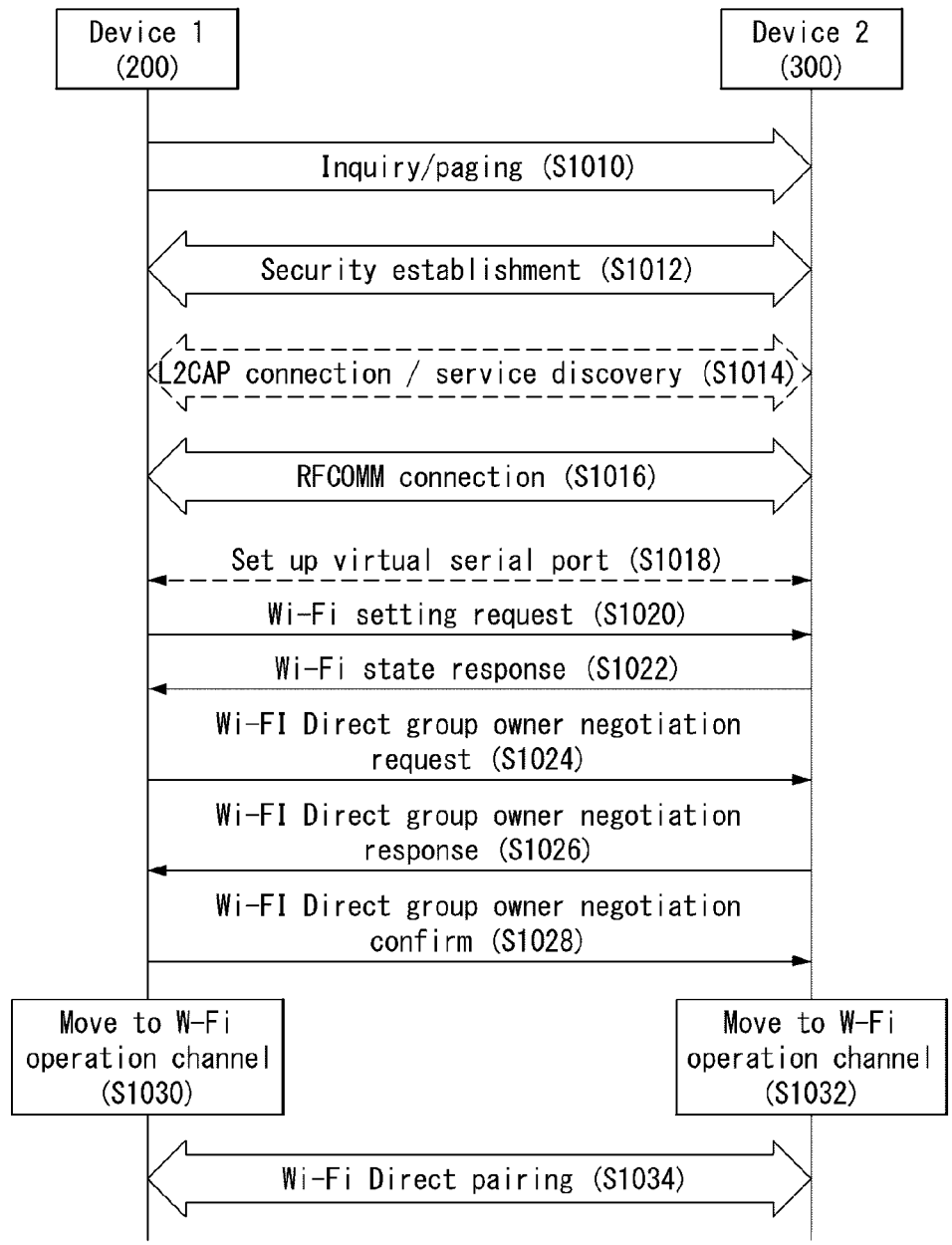

FIGS. 10 and 11 are diagrams showing a process for performing a Wi-Fi P2P pairing procedure using Bluetooth pairing and an example of a data structure to which an embodiment of the present invention may be applied.

Referring to FIG. 10, after Bluetooth pairing between devices is performed, information for Wi-Fi P2P pairing may be transmitted using connected Bluetooth. A Wi-Fi Direct connection may be performed based on the transmitted information.

More specifically, the device 1 200 and the device 2 300 perform Bluetooth pairing through the inquiry procedure and paging procedure described with reference to FIG. 5 (S1010).

The paging procedure refers to step in which hopping sequences are synchronized using address and clock information and an actual connection is performed if surrounding connectable Bluetooth devices are discovered through the inquiry procedure.

The device 1 200 and the device 2 300 that have performed the connection experience an L2CAP connection and service discovery step (S1014) via a security establishment step (S1012).

A Logical Link Control and Adaption Protocol (L2CAP) is a protocol of a packet method, and it has characteristics similar to those of the UDP protocol. The packet size of the L2CAP is basically a maximum of 672 bytes, but may be changed up to a maximum of 65,535 bytes when communication starts.

Thereafter, the device 1 200 and the device 2 300 may connect radio frequency communication (RFFCOMM) protocols (S1016) and set up a virtual serial port through the RFFCOMM protocols (S1018).

The RFCOMM protocol is a protocol produced to replace the existing wired RS232 serial port. The RFCOMM protocol has characteristics similar to those of the TCP protocol and may have 30 port numbers.

The virtual serial port is also referred to as a Serial Port Profile (SPP), and it refers to a method for substituting a physical serial port wirelessly using Bluetooth communication in a device related to a user interface with a PC.

The device 1 200 sends a Wi-Fi setting request message to the device 2 300 using the SPP through the RFCOMM (S1020). The device 2 300 may send a Wi-Fi state response message to the device 1 200 in response to the Wi-Fi setting request message (S1022).

The device 1 200 that has received the Wi-Fi state response message may send a Wi-Fi Direct group owner negotiation request message in order to negotiate with the device 2 300 about the determination of a group owner (S1024).

Thereafter, the device 2 300 may send a Wi-Fi Direct group owner negotiation response message to the device 1 200 (S1026). The device 1 200 may determine a Wi-Fi group owner based on the received Wi-Fi Direct group owner negotiation response message.

The device 1 200 that has determined the group owner may include the results of the determination in a Wi-Fi Direct group owner negotiation confirm message and send the Wi-Fi Direct group owner negotiation confirm message to the device 2 300 (S1028).

FIG. 11 shows the structure of the Wi-Fi group owner negotiation message.

The Wi-Fi group owner negotiation message 1110 may include Op_Code 1120 and a Data field. The Op_Code includes code for distinguishing the three types (i.e., Request/Response/Confirm) of messages of from each other because the messages are not distinguished on a Bluetooth SPP.

If the Op_Code is 1, the Wi-Fi group owner negotiation message may be a Request form. If the Op_Code is 2, the Wi-Fi group owner negotiation message may be a Response form. If the Op_Code is 3, the Wi-Fi group owner negotiation message may be a Confirm form.

The Data field may include information for negotiating a group owner. The Data field may include the same data as that of the group owner negotiation message described with reference to FIG. 7.

The device 1 200 and the device 2 300 that have exchanged the three types of group owner negotiation messages (Request/Response/Confirm) may move to a Wi-Fi operation channel (S1030 and S1032) and perform pairing through a Wi-Fi Direct procedure, such as a beacon/probing (S1034).

Figure 12:
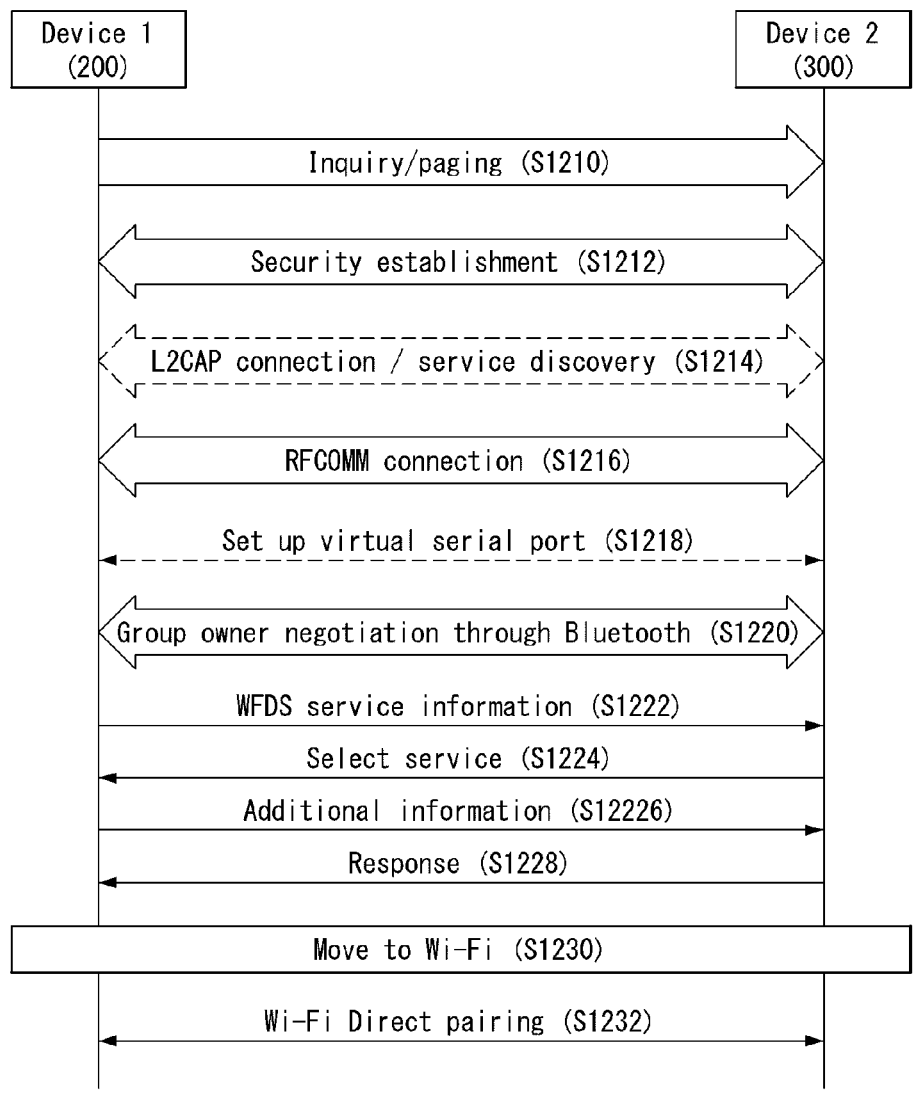
FIGS. 12 and 13 are diagrams showing a process for sending information for Wi-Fi P2P services using Bluetooth pairing and an example of a data structure to which an embodiment of the present invention may be applied.
Figure 13:
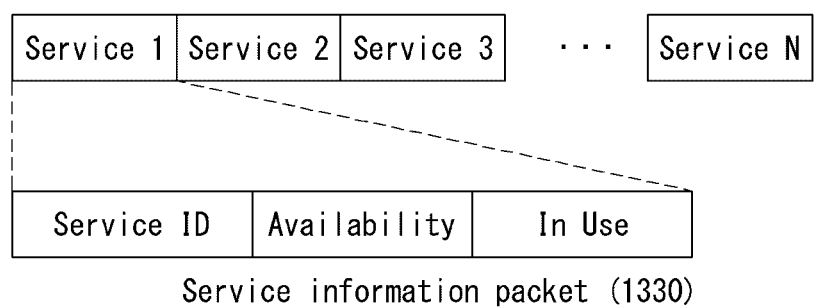

FIGS. 12 and 13 are diagrams showing a process for sending information for Wi-Fi P2P services using Bluetooth pairing and an example of a data structure to which an embodiment of the present invention may be applied.

Referring to FIG. 12, after the group owner negotiation procedure through Bluetooth described with reference to FIG. 11, the devices may send Wi-Fi Direct service information.

S1210 to S1218 of FIG. 12 are the same as S1010 to S1018 of FIG. 10 and a group owner negotiation step S1220 through Bluetooth is the same as S1020 to S1028 of FIG. 10, and a description thereof is omitted.

More specifically, after determining the Wi-Fi group owner through Bluetooth along with the device 2 300, the device 1 200 may send a Wi-Fi Direct service information message to the device 2 300 (S1222).

The structure of the service information message is shown in FIG. 13.

Referring to FIG. 13, the service information message 1300 includes fields for respective supportable services. The supportable service fields may include a Service ID field, a field indicative of Availability and/or an In Use field indicative of in-use.

The Service ID field is a field indicative of the type of service. For example, if the Service ID field has a value of 1, it may indicate a Miracast service. If the Service ID field has a value of 2, it may indicate a WFDS-SEND service.

The device 2 300 that has received the service information message may select a service to be provided and send a service selection message, including the ID of the selected service, to the device 1 200 (S1224).

Thereafter, the device 1 200 may send additional information about the selected service to the device 2 300 (S1226). The device 2 300 may send a response message for the additional information to the device 1 200 (S1228).

The device 1 200 and the device 2 300 that have transmitted/received pieces of information about the Wi-Fi Direct service may change a communication method from Bluetooth communication to Wi-Fi (S1230) and perform a Wi-Fi Direct connection (S1232).

Figure 14:
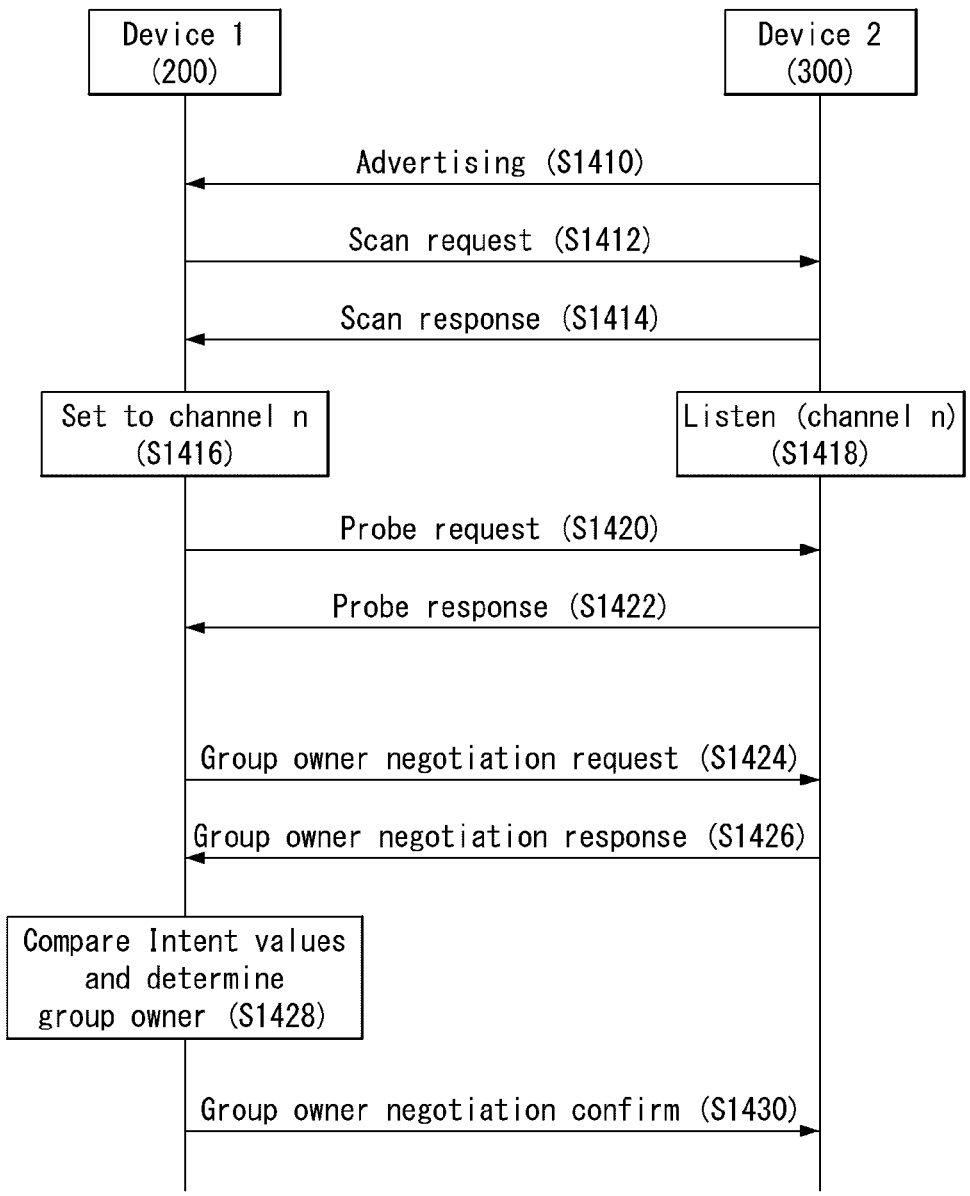

FIGS. 14 and 15 are diagrams showing a Wi-Fi P2P pairing process using Bluetooth Low Energy (LE) and an example of a message structure to which an embodiment of the present invention may be applied.

Referring to FIG. 14, in a Bluetooth pairing procedure using a Bluetooth Low Energy (LE) technology, a Wi-Fi Direct connection may be performed by exchanging pieces of information for the Wi-Fi Direct connection.

More specifically, the device 2 300 may send an advertising message to the device 1 200 (S1410). The advertising message may be used to notify another device of information (e.g., a device name, service information, and manufacturer data) about the device 2.

The device 1 200 that has received the advertising message from the device 2 300 may send a scan request message to the device 2 300 in order to request additional information about the device 2 300 (S1412).

In this case, the device 1 200 may send the scan request message, including the Wi-Fi Direct information request of the device 2 300, to the device 2 300.

The device 2 300 that has received the scan request message may include its own Wi-Fi Direct information in a scan response message and send the scan response message to the device 1 200 (S1414).

The structures of the scan request message 1510 and the scan response message 1520 are shown in FIG. 15.

Referring to FIG. 15, the scan request message 1510 may include a scan address field, an Adv address, and a More Information (MI)_flag field. The scan address field may be indicative of the address of a device that sends the scan request message. The Adv address may be indicative of the address of a device that has received the scan request message 1510.

The MI_flag field is a field for requesting information related to other networks other than Bluetooth to be connected by the device 1 200. For example, if the MI_flag field has a specific value (e.g., 0x01), the device 1 200 may request Wi-Fi Direct information from the device 2 300.

The other networks may include, for example, WiGig, Wi-Fi infrastructure, Zigbee, and ANT+. In addition, the device 1 200 may request information about other networks from the device 2 300 through a scan request message.

The MI_flag may have values shown in Table 16 below.

TABLE 16

| MI_FLAG (1 BYTE) | |
|---|---|
| Type | Description |
| 0x01-0xFE | Other Network information |
| 0xFF | Reserved |

The scan response message 1520 may include an Adv address field, a data field, and a listen channel field. The listen channel field may include a value related to a listen channel indicating that the device 2 300 stays in which channel.

In the case of the Bluetooth LE method, all pieces of required information are unable to be included as in the Bluetooth BR/EDR method because a maximum size of data which may be included in a PDU is limited to 39 bytes. Accordingly, the device 2 300 may include only some information for Wi-Fi Direct pairing in the scan response message 1520. For example, the device 2 300 may include information about a listen channel in the scan response message 1520.

The device 1 200 that has received the scan response message may change a channel to a listen channel included in the scan response message (S1416). The device 2 300 may stay in a channel "n", that is, the listen channel included in the scan response message (S1418).

Thereafter, the device 1 200 may send a probe request message to the device 2 300 in the changed channel (S1420). When the probe response message is received in the channel n, the device 2 300 may send a probe response message to the device 1 200 (S1422).

The device 1 200 and the device 2 300 may be aware of whether they are present in the channel "n" through the probe request message and the probe response message and may perform a procedure for a group owner negotiation.

S1424 to S1430 of FIG. 14 are the same as S740 to S770 of FIG. 7, and thus a detailed description thereof is omitted.

In the embodiment of FIG. 14, a Wi-Fi Direct finding procedure may not be omitted, but the time taken to perform a channel finding procedure can be significantly reduced because the listen channel of the device 2 300 is already known and a probe request message is transmitted.

Figure 16:
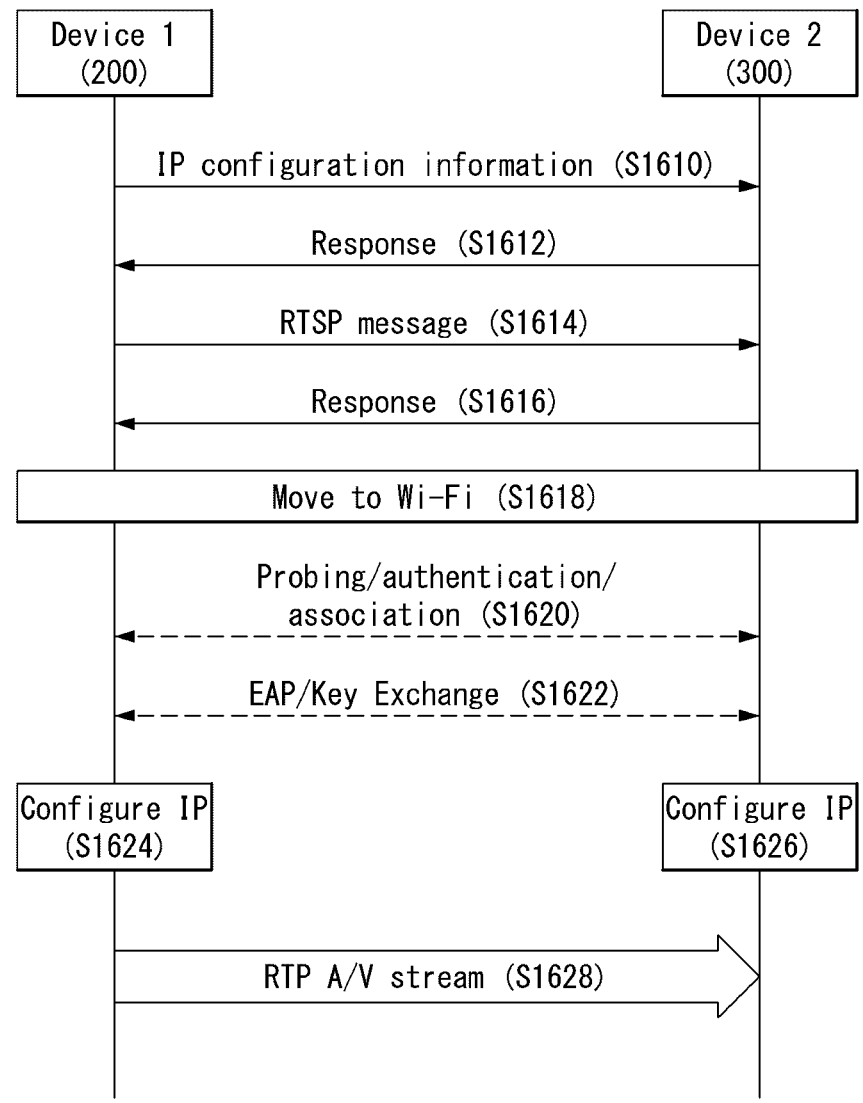
FIG. 16 is a flowchart illustrating an example of a process for providing a Wi-Fi P2P Miracast service using Bluetooth pairing to which an embodiment of the present invention may be applied.

FIG. 16 is a flowchart illustrating an example of a process for providing a Wi-Fi P2P Miracast service using Bluetooth pairing to which an embodiment of the present invention may be applied.

Referring to FIG. 16, a procedure through Wi-Fi can be reduced by exchanging pieces of information necessary to provide Miracast through the Bluetooth.

More specifically, after the service selection step (S1224) of FIG. 12, the device 1 200 may send IP configuration information to the device 2 300 (S1610). The IP configuration information may include information (e.g., a local IP, a Peer IP, and a Subnet) for an IP configuration.

The device 2 300 that has received the IP configuration information may send a response to the IP configuration information to the device 1 200 (S1612).

The device 1 300 that has received the response from the device 2 300 may send Real Time Streaming Protocol (RTSP) information to the device 2 300 (S1614). The device 2 300 may send a response to the RTSP information to the device 1 200 (S1616).

Thereafter, the device 1 200 and the device 2 300 may change a communication method from Bluetooth to Wi-Fi (S1618) and perform probing, authentication, and association procedures for a Wi-Fi connection (S1620).

After performing the probing, authentication, and association procedures, the device 1 200 and the device 2 300 performs an Extensible Authentication Protocol (EAP) and key exchange procedure (S1622) and performs IP configurations for providing a Miracast service (S1624, S1626).

In this case, the device 1 200 and the device 2 300 may directly configure IPs without experiencing a separate Dynamic Host Configuration Protocol (DHCP) procedure because they are already aware of information about a local Ip, a Peer IP, and a Subnet through Bluetooth.

Furthermore, after configuring the IPs, the device 1 200 and the device 2 300 may provide a Real Time Transport Protocol (RTP) A/V stream service by performing only some of the RTSP procedure without performing the entire RTSP procedure because they are already aware of RTSP information through Bluetooth (S1628).

Figure 17:
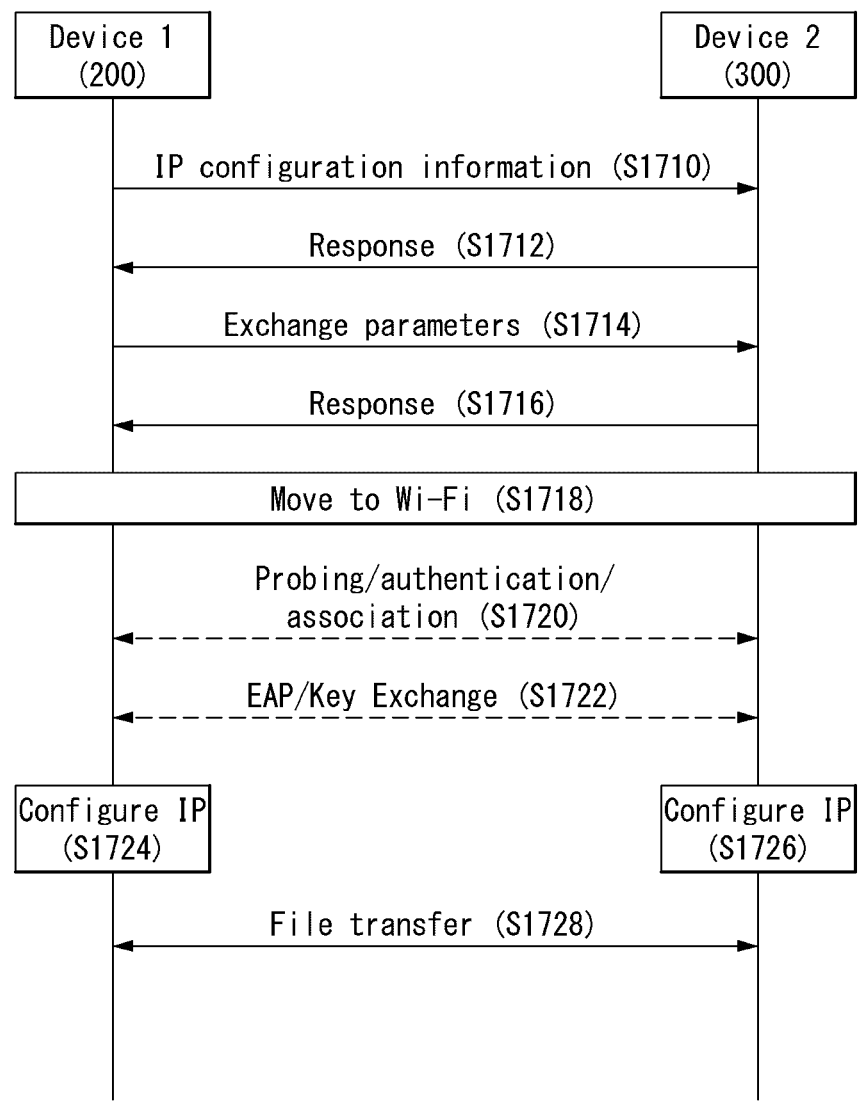
FIG. 17 is a flowchart illustrating an example of a process for providing a Wi-Fi P2P file transfer service using Bluetooth pairing to which an embodiment of the present invention may be applied.

FIG. 17 is a flowchart illustrating an example of a process for providing a Wi-Fi P2P file transfer service using Bluetooth pairing to which an embodiment of the present invention may be applied.

Referring to FIG. 17, a procedure through Wi-Fi Direct can be reduced by exchanging pieces of information necessary to provide a file transfer service through the Bluetooth.

S1710 and S1712 of FIG. 17 are the same as S1610 and S1612 of FIG. 16, and thus a description thereof is omitted.

The device 1 200 may request the exchange of parameters for providing a file transfer service from the device 2 300 (S1714).

The parameter exchange message may include values shown in Table 17 below.

TABLE 17

| EID | VALUE |
|---|---|
| 0x03 | Transport Protocol (TCP or UDP) |
| 0x04 | Port |
| 0x05 | Service Info. |
| 0x06 | File Name |
| 0x07 | Sharable |
| 0x08 | File Size |
| 0x09 | Transmission Timeout |

The device 2 300 that has received the parameter exchange message may send a response message for the parameter exchange message to the device 1 200 (S1716).

Thereafter, S1718 to S1726 of FIG. 17 are the same as S1618 to S1626 of FIG. 6, and thus a description thereof is omitted.

The procedure of FIG. 17 corresponds to a file transfer service and does not include a separate RTSP procedure unlike in the procedure of FIG. 16. Accordingly, in the procedure of FIG. 17, the omission and execution of some of the procedure of FIG. 16 are not performed.

After performing IP configurations, the device 1 200 and the device 2 300 may provide a file transfer service (S1728).

The methods for efficiently performing Wi-Fi Direct pairing using Bluetooth have been described above. In an embodiment of the present invention, Wi-Fi Direct is only an example, and pairing for other network connections in addition to Wi-Fi Direct can be performed efficiently through the methods described in connection with the embodiments of the present invention.

The present invention may be substituted, modified, and changed in various ways by those skilled in the art to which the present invention pertains without departing from the technical spirit of the present invention and thus is not limited to the aforementioned embodiments and the accompanying drawings.

INDUSTRIAL APPLICABILITY

This specification provides a method and device for forming a network in a wireless communication system. In particular, this specification provides a method and device for forming a network other than Bluetooth through Bluetooth, that is, a short-distance wireless communication technology.

The invention claimed is:

1. A method for establishing a communication link using a Bluetooth link in a wireless communication system, the method performed by a first device and comprising: transmitting, by the first device, an inquiry message to discover a second device for Bluetooth pairing, wherein the inquiry message includes an identifier (ID) for identifying the first device; receiving, by the first device, an extended inquiry response message from the second device based on the inquiry message, wherein the extended inquiry response message includes network type information indicating a network different from the Bluetooth to be established through the Bluetooth link and setting information for establishing the network; and establishing, by the first device, a connection of the network based on the network type information and the setting information.

2. The method of claim 1, further comprising:
transmitting service information related to the network to the second device; and
receiving a service selection message from the second device.

3. The method of claim 2, wherein the service information includes at least one of a Miracast service or a file transfer service.

4. The method of claim 1, wherein the setting information includes at least one of channel information indicating a channel for establishing the network, channel type information indicating a type of the channel, data rate information indicating a data rate of the network, or configuration information for setting the connection.

5. The method of claim 1, wherein the inquiry message including the ID is repeatedly transmitted continuously.

6. A method for establishing a communication link using a Bluetooth link in a wireless communication system, the method performed by a first device and comprising: transmitting, by the first device, a first message for establishing a connection of a network other than a Bluetooth through the Bluetooth link, wherein the first message includes network type information indicating the network and setting information for establishing the network; receiving, by the first device, a response to the first message through the Bluetooth link; performing a group owner negotiation procedure along with a second device through the Bluetooth link; and establishing, by the first device, the connection based on the network type information and the setting information.

7. The method of claim 6, further comprising:
transmitting service information related to the network to the second device; and
receiving a service selection message from the second device.

8. The method of claim 7, wherein the service information includes at least one of a Miracast service or a file transfer service.

9. The method of claim 6, wherein the performing the group owner negotiation procedure comprises:
transmitting a request message including first information to the second device;
receiving a response message including second information in response to the request message from the second device;
determining a group owner based on the first information and the second information; and
transmitting a confirm message including status information indicating the determined group owner to the second device.

10. The method of claim 9, wherein the first information includes a first numerical value and a first random value, and wherein the second information includes a second numerical value and a second random value.

11. The method of claim 10, wherein the determining the group owner comprises:
comparing the first numeric value to the second numerical value,
wherein the first device is determined as the group owner, when the first numerical value is greater than the second numerical value.

12. The method of claim 11, wherein the determining the group owner further comprises:
comparing the first random value to the second random value, when the first numerical value and the second numerical value are equal,
wherein the first device is determined as the group owner, when the first random value is greater than the second random value.

13. A method for forming a communication link using a Bluetooth link in a wireless communication system, the method performed by a first device and comprising: receiving, by the first device, an advertising message including information related to a second device from the second device; transmitting, by the first device, to the second device, a request message requesting network information for establishing a connection of a network different from a Bluetooth based on the advertising message; receiving, by the first device, a response message including the network information; and establishing, by the first device, connection based on the network information, wherein the network information includes network type information indicating the network and setting information for establishing the network.

* * * * *